(12) United States Patent
Li

(10) Patent No.: US 8,287,016 B2
(45) Date of Patent: Oct. 16, 2012

(54) GRIPPER FOR ROBOT

(75) Inventor: Jie Li, Shenzhen (CN)

(73) Assignees: Fu Tai Hua Industry (Shenzhen) Co., Ltd., ShenZhen, Guangdong Province (CN); Hon Hai Precision Industry Co., Ltd., Tu-Cheng, New Taipei (TW)

( * ) Notice: Subject to any disclaimer, the term of this patent is extended or adjusted under 35 U.S.C. 154(b) by 133 days.

(21) Appl. No.: 13/027,424

(22) Filed: Feb. 15, 2011

(65) Prior Publication Data
US 2011/0304167 A1 Dec. 15, 2011

(30) Foreign Application Priority Data
Jun. 11, 2010 (CN) .......................... 2010 1 0198357

(51) Int. Cl.
*B25J 15/00* (2006.01)
*B25J 17/00* (2006.01)

(52) U.S. Cl. .................. 294/86.4; 294/207; 901/45
(58) Field of Classification Search ................ 294/86.4, 294/192, 207, 87.1, 119.1, 213, 2; 901/37, 901/45
See application file for complete search history.

(56) References Cited

U.S. PATENT DOCUMENTS

| | | | | |
|---|---|---|---|---|
| 4,715,636 A | * | 12/1987 | Wiesner et al. | 294/86.4 |
| 4,915,574 A | * | 4/1990 | Park et al. | 414/680 |
| 5,397,159 A | * | 3/1995 | Sartorio et al. | 294/86.4 |
| 5,421,696 A | * | 6/1995 | Stephan et al. | 414/751.1 |
| 6,336,669 B1 | * | 1/2002 | Laubach | 279/3 |

* cited by examiner

*Primary Examiner* — Dean Kramer
(74) *Attorney, Agent, or Firm* — Altis Law Group, Inc.

(57) ABSTRACT

A gripper includes a connecting member and two clamping assemblies fixed on the connecting member. Each clamping assembly includes a main body and two positioning shafts. The main body defines two pivot holes, in which the positioning shafts are slidably received. Each of the positioning shafts includes a shaft sleeve, a positioning pin, a driving pin, and a plurality of balls. The positioning pin and the driving pin are received in the shaft sleeve, and the driving pin resists the positioning pin. The shaft sleeve defines a plurality of receiving holes for receiving the balls. An inner wall in the pivot hole defines a restricting groove. The driving pin is capable of driving the balls partially into the restricting groove, and driving the positioning pin partially out of the shaft sleeve.

20 Claims, 6 Drawing Sheets

GRIPPER FOR ROBOT

BACKGROUND

1. Technical Field

The present disclosure relates generally to robotics and, more particularly, to a gripper for a robot.

2. Description of Related Art

A commonly used industrial robot includes a fixed base, a frame pivotally connected thereto about a first rotation axis, a lower arm, one end of which is pivotally connected to the frame about a second rotation axis, and an upper arm, one end of which is pivotally connected to the other end of the lower arm about a third rotation axis. An actuator, such as a gripper, is mounted at a distal end of the upper arm of the industrial robot to execute specific tasks.

The gripper includes a main body, a positioning pin mounted at a middle of the body, and two grasping members movably connected to opposite ends of the main body, respectively. In grasping a workpiece, the positioning pin is received in a positioning hole of the workpiece, and the grasping members clamp the workpiece.

However, the positioning pin, when received in the positioning hole of the workpiece, easily deviates from a predetermined path due to limited accuracy of the industrial robot and inertial force, resulting in damage to the workpiece.

Therefore, there is room for improvement within the art.

BRIEF DESCRIPTION OF THE DRAWINGS

The components in the drawings are not necessarily drawn to scale, the emphasis instead placed upon clearly illustrating the principles of the present disclosure. Moreover, in the drawings, like reference numerals designate corresponding parts throughout the several views.

DETAILED DESCRIPTION

Figure 1:
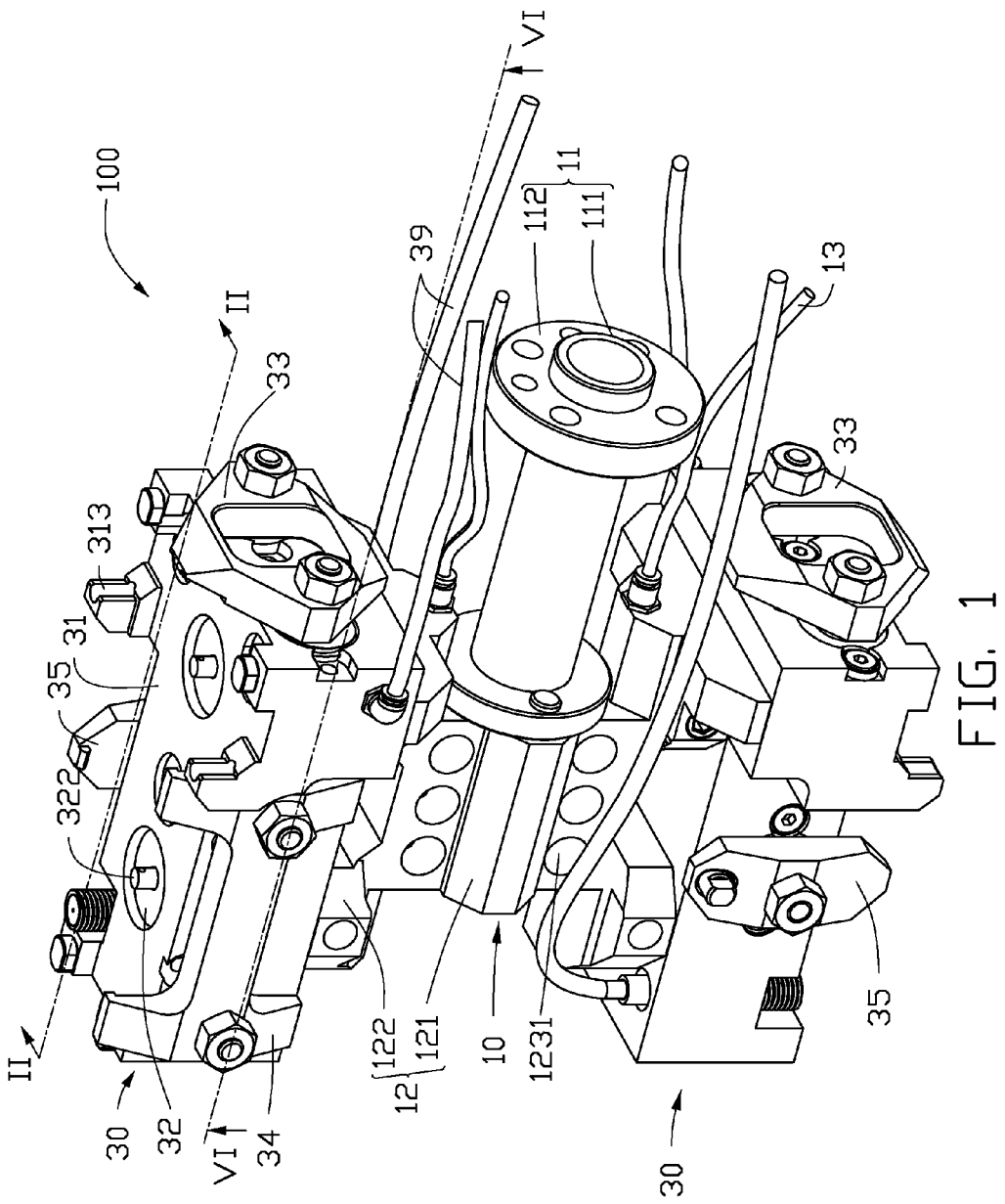
FIG. 1 is an assembled, isometric view of an embodiment of a gripper.
Figure 2:
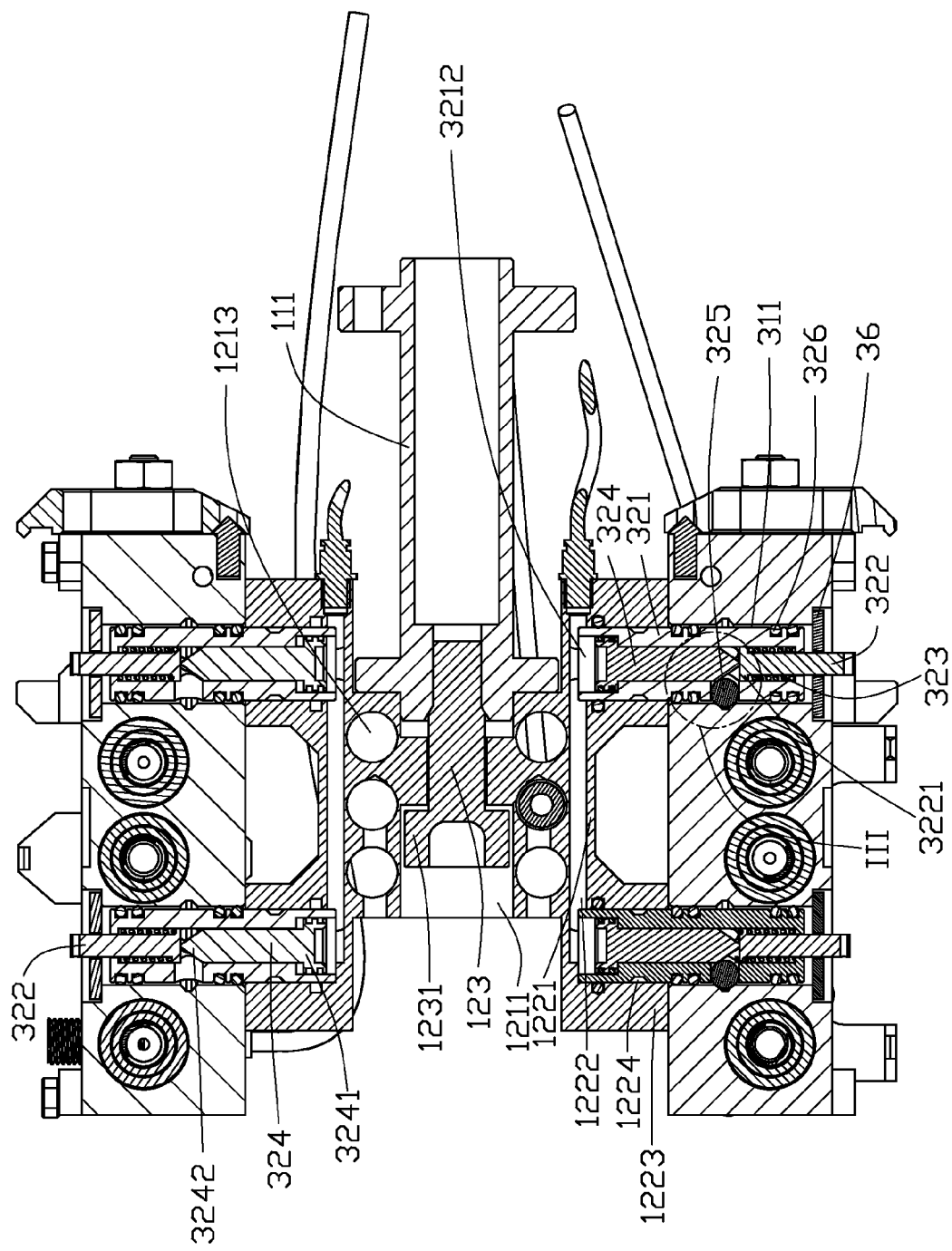
FIG. 2 is a cross-section of the gripper of FIG. 1, taken along a line II-II.
Figure 3:
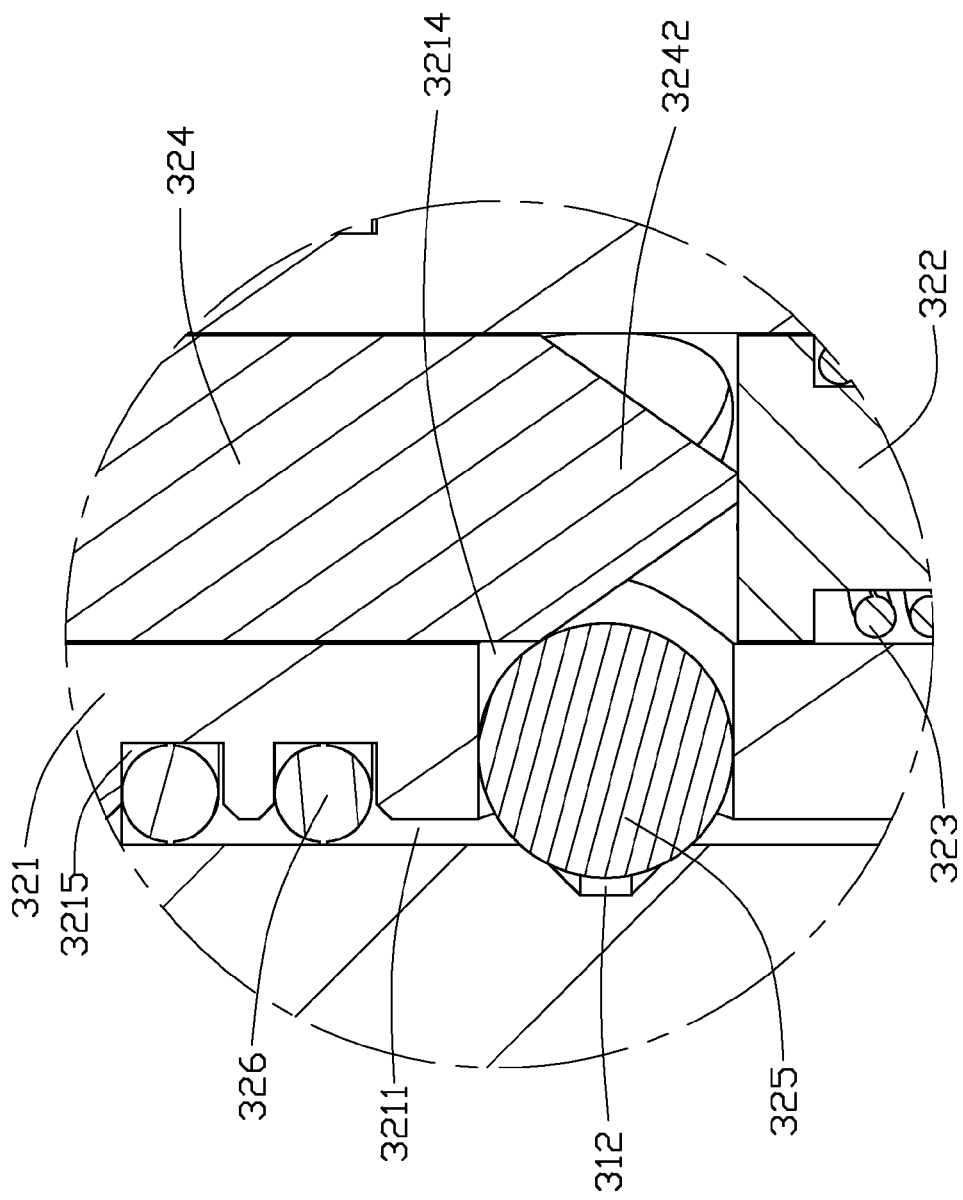
FIG. 3 an enlarged view of a circular part III of FIG. 2.
Figure 4:
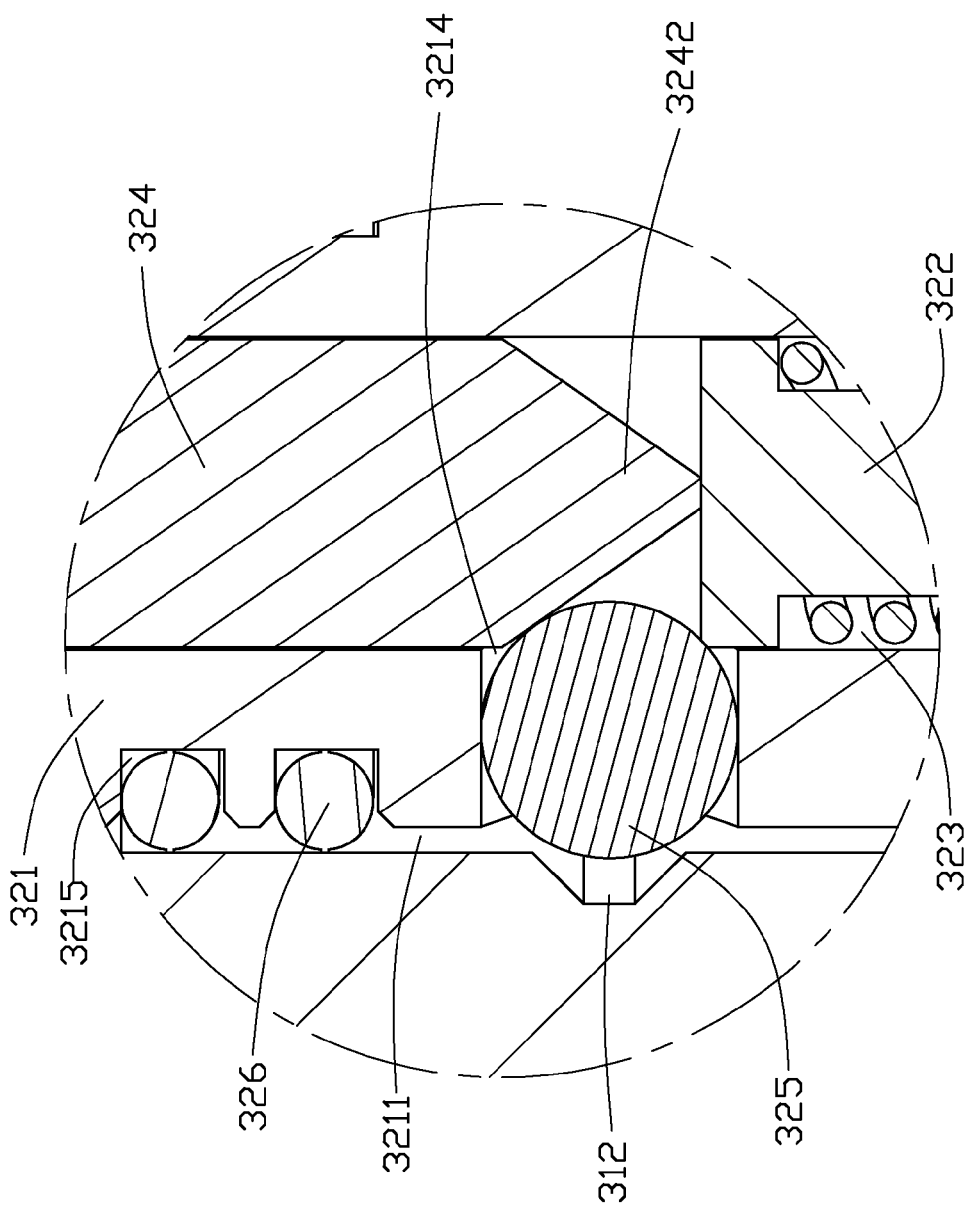
FIG. 4 is similar to FIG. 3, but shows balls disengaging from a restricting groove of the main body.

Referring to FIGS. 1 and 2, an embodiment of a gripper 100 includes a connecting member 10 and two clamping assemblies 30 positioned on opposite sides of the connecting member 10 respectively.

The connecting member 10 includes a first connecting portion 11 and a second connecting portion 12 fixed on an end of the first connecting portion 11. The first connecting portion 11 includes a hollow cylindrical main shaft 111 and two annular fixing members 112 positioned on opposite ends of the main shaft 111. The second connecting portion 12 includes a support body 121 and two connecting blocks 122 positioned on opposite sides of the support body 121. The support body 121 axially defines a connecting hole (not labeled), and a receiving groove 1211 communicating with the connecting hole. A connecting shaft 123 extends through the connecting hole, and is connected to the main shaft 111. A flange 1231 formed on an end of the connecting shaft 123 is received in the receiving groove 1211. The support body 121 further defines a plurality of through holes 1213. Each connecting block 122 includes a base plate 1221 and two connecting bars 1223 extending from opposite ends of the base plate 1221. The base plate 1221 defines an air passage 1222 communicating with an air conduit 13. Each connecting bar 1223 defines an assembly groove 1224 communicating with the air passage 1222 of the base plate 1221.

Each clamping assembly 30 includes a main body 31, two positioning shafts 32, a first clamping member 33, a second clamping member 34, and a third clamping member 35. The positioning shafts 32 are positioned in a middle portion of the main body 31. The first clamping member 33, the second clamping member 34, and the third clamping member 35 are fixed on an edge of the main body 31. The main body 31 defines two assembly holes 311 receiving the positioning shafts 32. Axes of the assembly holes 311 are parallel. A sidewall of each assembly hole 311 defines an annular restricting groove 312. The main body 31 further forms a plurality of positioning portions 313 around the edge of the main body 31.

Figure 5:
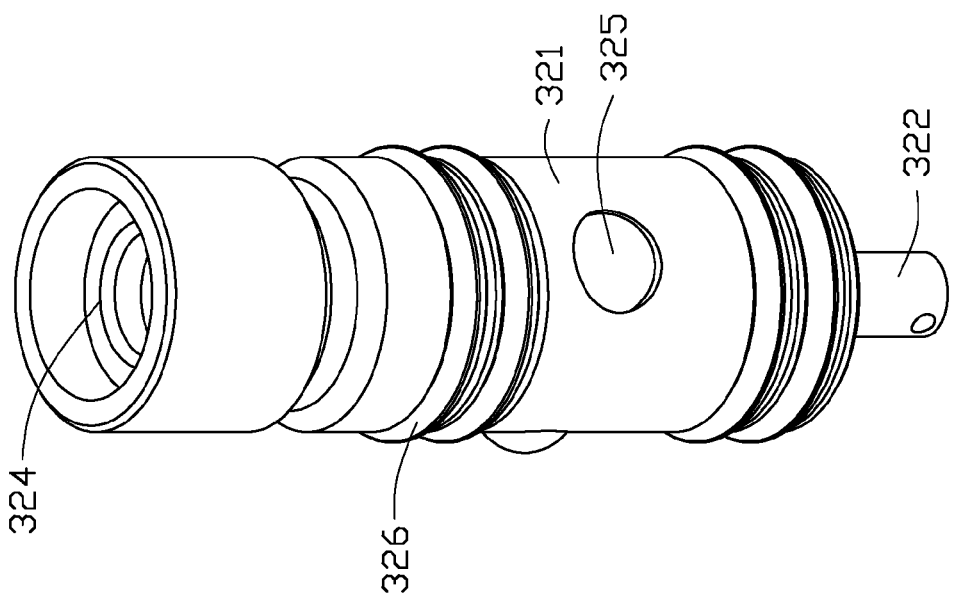
FIG. 5 is an isometric view of the positioning shaft of FIG. 2.

Each positioning shaft 32 is partially received in the assembly groove 1224 of the second connecting portion 12, and partially received in the assembly hole 311 of the main body 31. Referring to FIGS. 2 and 5, the positioning shaft 32 includes a shaft sleeve 321, a positioning pin 322, an elastic member 323, a driving pin 324, a plurality of balls 325, and a spring washer 326. In the illustrated embodiment, the elastic member 323 is a compression spring. The shaft sleeve 321 axially defines a pivot hole 3211, a receiving groove 3212, and a through hole (not labeled). The receiving groove 3212 and the through hole communicate with opposite ends of the pivot hole 3211. The positioning pin 322 forms a flange 3221 at an end thereof. The positioning pin 322 is received in the pivot hole 3211, and partially extends out from the through hole of the shaft sleeve 321. The elastic member 323 is sleeved on the positioning pin 322, and opposite ends of the elastic member 323 resist the flange 3221 and the shaft sleeve 321 respectively. The driving pin 324 forms a flange 3241 in a first end, and a conical head portion 3242 in a second end opposite to the first end. The driving pin 324 is positioned in the pivot hole 3211, with the head portion 3242 resisting the positioning pin 322, and the flange 3241 received in the receiving groove 3212. The main body 31 further forms a fixing plate 36 corresponding to the pivot hole 3211, thereby preventing the positioning shaft 32 from disengaging from the pivot hole 3211.

The shaft sleeve 321 defines a plurality of receiving holes 3214 in an outer surface of a same height, and a plurality of restricting grooves 3215 in the outer surface located at opposite sides of the receiving holes 3214. The balls 325 are received in the receiving holes 3214, and capable of partially extending out of the outer surface of the shaft sleeve 321, driven by the driving pin 324. The spring washers 326 are received in the restricting grooves 3215 of the shaft sleeve 321.

Figure 6:
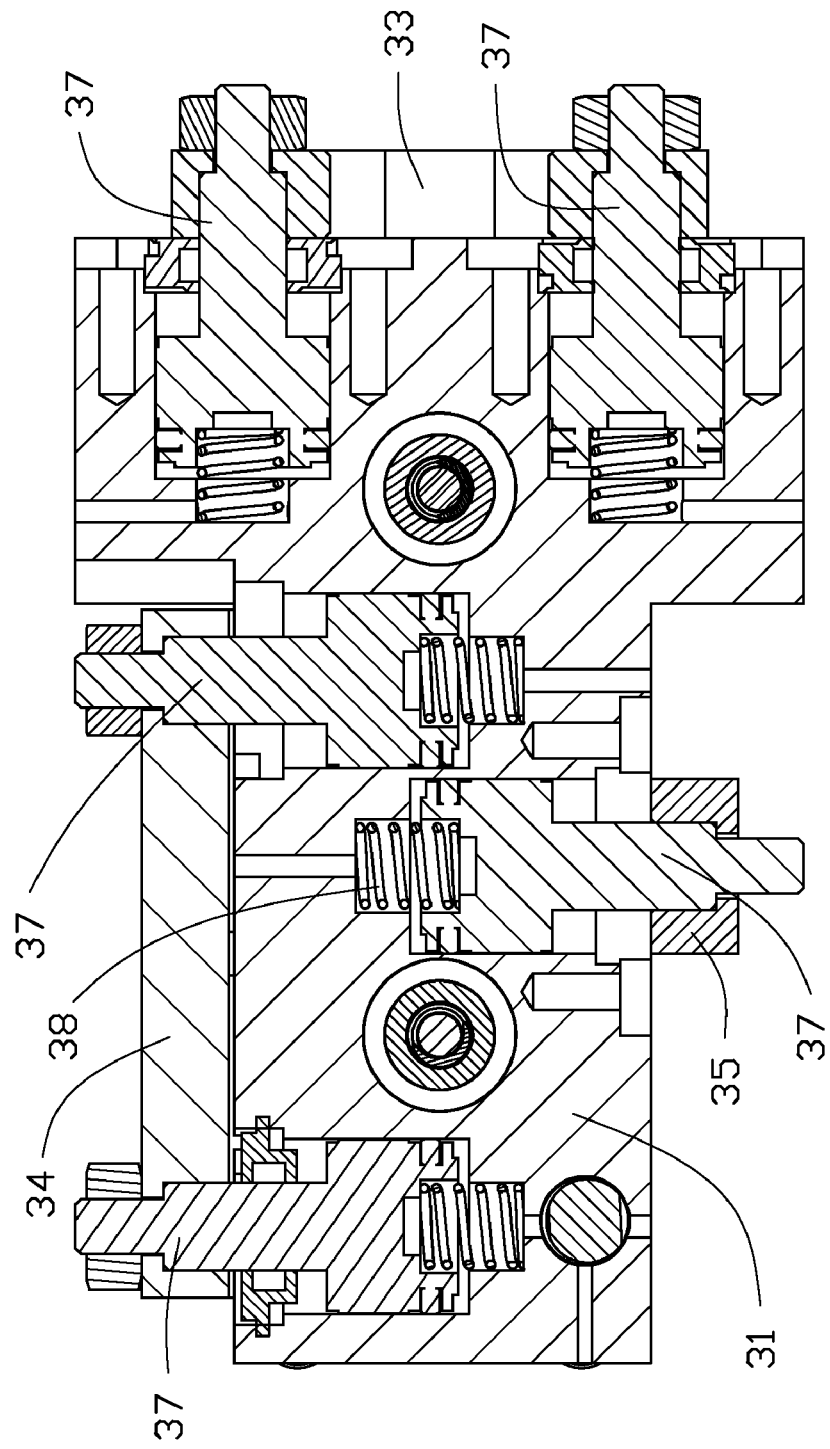
FIG. 6 is a cross-section of the gripper of FIG. 1, taken along the line VI-VI.

Referring to FIGS. 2 and 6, a plurality of air cylinders 37 is positioned in the main body 31. A bottom end of each air cylinder 37 is connected to one corresponding elastic member 38 inside of the main body 31. A top end of each air cylinder 37 is connected to the first clamping member 33, the second clamping member 34, or the third clamping member 35. A plurality of air tubes 39 is positioned on the main body 31, supplying compressed air to the air cylinders 37.

Referring to FIGS. 1 through 6, in use, the gripper 100 is connected to a robot arm (not shown), and the gripper 100 moves onto a workpiece (not shown) driven by the robot arm. The workpiece is positioned between the positioning portions 313 of the main body 31. Compressed air is injected into the air passage 1222 via the air conduit 13. The driving pins 324 are then driven by the compressed air, whereby the positioning pins 322 are driven out of the main body 31 by the driving pin 324, to further position the workpiece. When the balls 325 are partially received in the restricting grooves 312, the driving pins 324 stop moving (see FIG. 3). The first clamping member 33, the second clamping member 34, and the third clamping member 35 move towards the positioning pins 322 driven by the air cylinders 37, to tightly hold the workpiece. The gripper 100 together with the workpiece then moves onto a predetermine machining position. The first clamping member 33, the second clamping member 34, and the third clamping member 35 move away from the positioning pins 322 driven by the air cylinders 37, to release the workpiece. When compressed air is no longer supplied in the air passage 1222, the positioning pins 322 are retracted into the main body 31, and the balls 325 disengage from the restricting grooves 312 (see FIG. 4). As a result, the workpiece is separated from the gripper 100, and positioned in the predetermined machining position.

Because the spring washers 326 are sleeved on the shaft sleeve 321, the shaft sleeve 321 may deviate from an axis of the pivot hole 3211, to prevent the workpiece from abrasion by the positioning pins 322 when the positioning pins 322 are received in the workpiece. During movement of the gripper 100, the balls 325 are received in the restricting grooves 312 of the main body 31, whereby the positioning shafts 32 are temporarily fixed to the main body 31. Therefore, the positioning pins 322 are immobilized and the workpiece stabilized during movement.

It should be appreciated that the gripper 100 may utilize only one clamping assembly 30 or more than two, as well as two clamping assemblies 30 for grasping multiple workpieces. In addition, the gripper 100 may have two or more than three clamping members.

It is believed that the present embodiments and their advantages will be understood from the foregoing description, and it will be apparent that various changes may be made thereto without departing from the spirit and scope of the disclosure or sacrificing all of its material advantages.

What is claimed is:

1. A gripper, comprising:
    a connecting member; and
    at least one clamping assembly fixed on the connecting member, and comprising a main body and at least one positioning shaft, the main body defining at least one pivot hole, the at least one positioning shaft being slidably received in the at least one pivot hole;
    wherein the at least one positioning shaft comprises a shaft sleeve, a positioning pin, a driving pin, and a plurality of balls; the positioning pin and the driving pin are received in the shaft sleeve, and the driving pin resists the positioning pin, the shaft sleeve defines a plurality of receiving holes for receiving the balls, and an inner wall in the at least one pivot hole defines a restricting groove; the driving pin is capable of driving the balls partially into the restricting groove, and driving the positioning pin partially out of the shaft sleeve.

2. The gripper assembly of claim 1, wherein the at least one positioning shaft further comprises an elastic member sleeved on the positioning pin, the positioning pin forms a flange at an end, and opposite ends of the elastic member resist the flange and the shaft sleeve respectively.

3. The gripper assembly of claim 1, wherein the driving pin forms a conical head portion at an end, and the head portion is attached to the balls.

4. The gripper assembly of claim 1, wherein the connecting member comprises a first connecting portion and a second connecting portion fixed on an end of the first connecting portion, the second connecting portion comprises a support body and two connecting blocks positioned on opposite sides of the support body, and the connecting blocks are connected to the main body.

5. The gripper assembly of claim 4, wherein the first connecting portion comprises a main shaft and two annular fixing members positioned on opposite ends of the main shaft.

6. The gripper assembly of claim 4, further comprising a connecting shaft, which connects the first connecting portion to the second connecting portion.

7. The gripper assembly of claim 4, wherein each connecting block comprises a base plate and two connecting portions extending from opposite ends of the base plate, the base plate defines an air passage, and each connecting portion defines an assembly groove communicating with the air passage of the base plate; the number of the at least one positioning shaft is two, and the two positioning shafts are partially received in the assembly grooves of the connecting portions.

8. The gripper assembly of claim 1, wherein the main body forms a plurality of clamping members in an edge thereof.

9. The gripper assembly of claim 8, further comprising a plurality of air cylinders positioned in the main body and connected to the clamping members.

10. The gripper assembly of claim 1, further comprising a closed plate positioned on an end of each pivot hole.

11. A gripper assembly, comprising:
    a connecting member; and
    at least one clamping assembly fixed on the connecting member, and comprising a main body and at least one positioning shaft, the main body defining at least one pivot hole, the at least one positioning shaft being slidably received in the at least one pivot hole;
    wherein the at least one positioning shaft comprises a shaft sleeve and at least one spring washer, the shaft sleeve defines at least one restricting groove, and the at least one spring washer is received in the at least one restricting groove, so that the positioning shaft is capable of deviating from an axis of the at least one pivot hole.

12. The gripper assembly of claim 11, wherein the positioning shaft further comprises a positioning pin, a driving pin, and a plurality of balls; the positioning pin and the driving pin are received in the shaft sleeve, and the driving pin resists the positioning pin, the shaft sleeve defines a plurality of receiving holes for receiving the balls, and an inner wall in the at least one pivot hole defines a restricting groove; the driving pin is capable of driving the balls partially into the restricting groove, and driving the positioning pin partially out of the shaft sleeve.

13. The gripper assembly of claim 12, wherein the at least one positioning shaft further comprises an elastic member sleeved on the positioning pin, the positioning pin forms a flange at an end, and opposite ends of the elastic member resist the flange and the shaft sleeve respectively.

14. The gripper assembly of claim 12, wherein the driving pin forms a conical head portion at an end, and the head portion is attached to the balls.

15. The gripper assembly of claim 12, wherein the connecting member comprises a first connecting portion and a second connecting portion fixed on an end of the first connecting portion, the second connecting portion comprises a support body and two connecting blocks positioned on opposite sides of the support body, and the connecting blocks are connected to the main body.

16. The gripper assembly of claim 15, wherein the first connecting portion comprises a main shaft and two annular fixing members positioned on opposite ends of the main shaft.

17. The gripper assembly of claim 15, further comprising a connecting shaft, which connects the first connecting portion to the second connecting portion.

18. The gripper assembly of claim 15, wherein each connecting block comprises a base plate and two connecting portions extending from opposite ends of the base plate, the base plate defines an air passage, and each connecting portion defines an assembly groove communicating with the air passage of the base plate; the number of the at least one positioning shaft is two, and the two positioning shafts are partially received in the assembly grooves of the connecting portions.

19. The gripper assembly of claim 11, wherein the main body forms a plurality of clamping members in an edge thereof.

20. The gripper assembly of claim 19, further comprising a plurality of air cylinders positioned in the main body and connected to the clamping members.

* * * * *